Nov. 17, 1953    H. J. RAND    2,659,567
VALVE WITH YIELDABLE FACE
Filed Feb. 12, 1949

*INVENTOR.*
HENRY J. RAND
BY
*Hyde, Meyer, Baldwin & Doran*
ATTORNEYS

Patented Nov. 17, 1953

2,659,567

UNITED STATES PATENT OFFICE 2,659,567

VALVE WITH YIELDABLE FACE

Henry J. Rand, Bratenahl, Ohio, assignor to Magic Seal, Inc., Bratenahl, Ohio, a corporation of Ohio Application February 12, 1949, Serial No. 76,071

4 Claims. (Cl. 251—27)

This invention relates to improvements in the sealing plug of a valve of a drip proof type which is adapted to be opened and closed by a feather touch.

One of the objects of the present invention is to provide a plug for use in a valve wherein the plug moves into the upstream end of the valve bore to seal the same with a line contact. The present invention provides a plug generally of resilient rubberlike material having a core of harder rubberlike material formed integrally therewith so as to stiffen the body of the plug, prevent singing and chattering of the valve, and to otherwise support the plug on the valve stem. Other objects and advantages of the present invention will be shown in the accompanying drawings and the essential features will be set forth in the appended claims.

In the drawings,

Figs. 3 and 4 are enlarged sectional views taken along similarly numbered lines of Fig. 1, while

Figure 1:
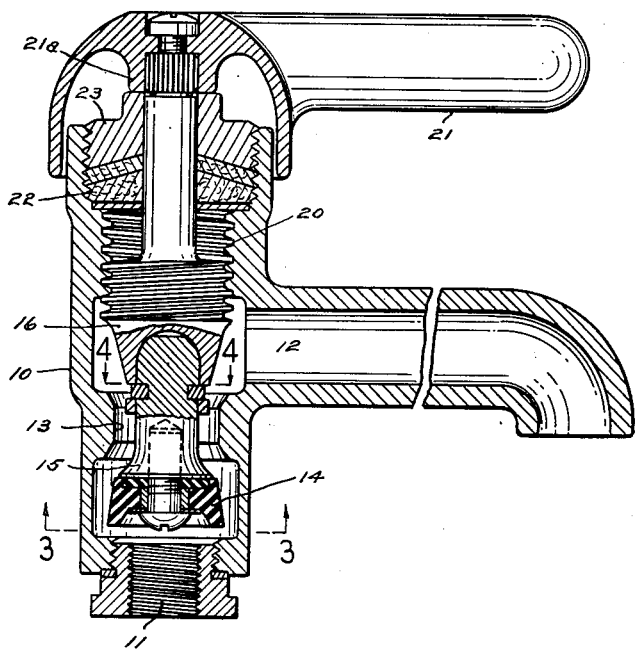
Fig. 1 is a central sectional view through a faucet equipped with my invention.

While my invention is applicable to many types of valves, I have chosen to illustrate the same as utilized in a well known type of faucet. This should be held in no way a limitation of my invention, as I intend to use my improvement in many types of valves.

My invention is shown as applied to a valve of the general type disclosed and claimed in my copending application Serial No. 71,092, filed January 15, 1949, to which reference may be had for a more complete description. It will suffice to say here that the valve housing 10 is provided with an inlet 11 and an outlet 12 and between them, a valve bore 13. A resilient plug 14 is firmly held on a stem portion 15 which is mounted to move axially with but to rotate relatively to the main stem 16. To this end, the upper end of stem portion 15 enters a recess in the lower end of the main stem 16 and is held rotatably therein by means of a U-shaped pin 17 which slides into the milled slots 18 of the stem 16 and engages in the annular groove 19 of the stem portion 15.

The main stem 16 has a threaded engagement at 20 with the upper end of the valve body. A handle 21 is rigidly attached to the upper end of stem portion 16 so as to rotate the same which causes the threaded engagement between the stem and housing to move the sealing plug 14 upwardly and downwardly. The upper end of the stem is packed in the usual manner by means of the packing 22 held in position by the packing nut 23. Downward movement of the valve stem is limited by engagement of the boss 21a on the handle with the packing nut 23. Upward movement of the valve plug is limited by engagement of the threaded portion of stem 16 against the bottom side of the packing 22.

Figure 5:
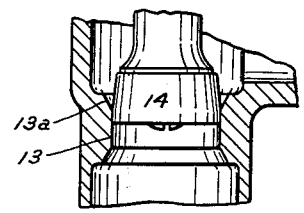
Fig. 5 is a view similar to certain portions of Fig. 1 showing the valve plug in side elevational view as being inserted into the valve bore from the top.
Figure 3:
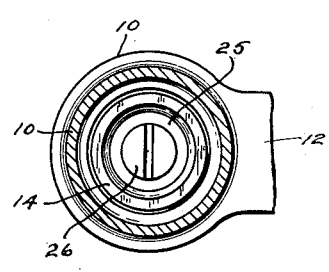

I have found that a cheap and simple way to provide a satisfactory plug for use in this type of valve consists in making a portion 14a of hard rubberlike material and a portion 14b of softer and more resilient rubberlike material. One of the advantages of this type of valve, especially in a faucet, is that it may be assembled by moving the plug 14 downwardly through the bore 13 when assembling the valve. This position of the parts is illustrated in Fig. 5. The upper end of the bore is flared as indicated at 13a so as to facilitate the entrance of the plug 14 into the bore. The plug 14 does not differ greatly in diameter from the bore 13 as set forth in my above-mentioned copending application.

Figure 2:
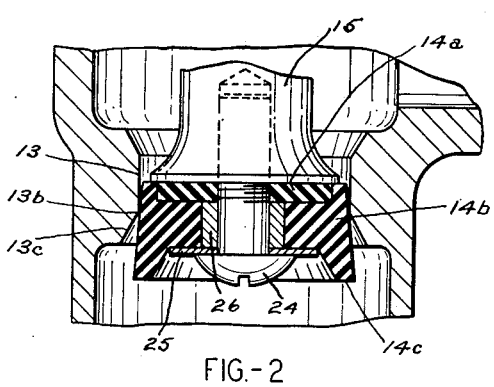
Fig. 2 is an enlarged fragmental sectional view of certain parts of Fig. 1, but showing the valve moved into closed position.
Figure 4:
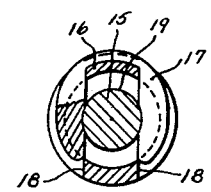

Preferably, however, the uppermost diameter of the plug 14 is slightly less than the diameter of bore 13, and the lowermost diameter of the plug 14 is slightly greater than the diameter of the bore 13. It is thus necessary for the outermost portion of plug 14 to be cammed inwardly as the parts move down as shown in Fig. 5 through the bore 13 to operative position as shown in Fig. 1. To this end, the plug 14 must have sufficient resilience to permit this operation. Furthermore, the resilience of the plug aids in the good sealing action which will be presently described in connection with Fig. 2.

To achieve these desirable results, I have conceived that at least the outermost portions of the plug 14 near the walls of the bore 13 must be of resilient rubberlike material, sufficiently soft that the plug will be cammed inwardly by the flaring bore portion 13a when the valve is being assembled. Also, if the plug is formed with a downwardly extending peripheral flange 14c at the bottom, as taught by my above-mentioned copending application, then a resiliency in this portion of the valve aids in the sealing action. Almost any portion of the plug inwardly from this zone and upwardly from the zone 14c may be made of the harder rubberlike material 14a which forms a backing disc. I have shown what I regard as the minimum extent of this more rigid rubberlike material in Figs. 1 and 2. Here the harder more strongly vulcanized rubberlike material 14a is of annular disk form surrounding the screw 24 which holds the plug 14 on the stem portion 15. For clearness in drawing, I have shown the portions 14a and 14b as rather definitely limited in area. Actually, I form the plug by vulcanizing these two parts together so that there is no real line of demarcation between the stiffer portions 14a and the more resilient portions 14b.

It is desirable that the stiff portion 14a extend almost to the periphery of the uppermost wall of the plug 14. This is to stiffen this portion of the plug which engages in sealing contact with the shoulder 13b on the valve housing where the flared portion of the bore 13c joins the main portion of the bore 13. At this point, there is a line contact between the parts. At this point also there is danger of singing and chattering of the valve as it approaches or leaves closed position. To prevent this, the uppermost portion of the plug 14 must be held quite rigid almost out to its outermost periphery. The hard rubber portion 14a provides this type of support.

The harder rubberlike portion 14a might extend through the central portion of the plug downwardly to engage the metal washer 25 which is held between the head of screw 24 and the main body of the plug. If this is not done, however, I utilize a spacer sleeve 26 which extends from the metal washer 25 upwardly along the screw 24 to engage against the harder rubberlike portion 14a as clearly shown in Figs. 1 and 2. The vertical height or thickness of the rubberlike portion 14a and the sleeve 26 is such as to limit the pressure exerted by the screw 24 as the plug 14 is pulled up tightly against the stem portion 15. This pressure is sufficient to hold the plug firmly on the flat lowermost face of stem portion 15 but is insufficient to cause the outermost walls of plug 14 to bulge outwardly.

What I claim is:

1. In a valve of the type wherein a housing is provided having a fluid inlet and a fluid outlet and having a cylindrical bore intermediate said inlet and outlet and communicating with both of them, and wherein a resilient sealing plug of frusto-conical form is adapted to pass through said bore and is movable into and out of the upstream end of said passage to seal said bore, said plug having a smaller diameter base downstream and of less diameter than the diameter of the bore and having its base of larger diameter not substantially greater than the diameter of said bore, the combination therewith of a sealing plug having a backing disc of hard rubber-like material and an outer cushion of soft rubber-like material bonded to said disc, said disc extending substantially to the periphery of said smaller diameter base and providing sufficient rigidity there to prevent said valve from chattering as said plug is moved into and out of the upstream end of said bore, and said outer cushion of soft rubber-like material radially outside of said disc engaging the walls of said bore to seal the same with an initial line contact, there being sufficient of said outer cushion of soft rubber-like material, radially outside of said disc, to permit said plug to pass through said bore.

2. A valve for cooperation with a substantially cylindrical valve bore of predetermined diameter and comprising a stem, a resilient sealing plug secured to said stem, said plug having a generally frusto-conical form with its smaller diameter base downstream and of less diameter than the diameter of the bore and with a base of larger diameter not substantially greater than the diameter of said bore, said stem having a face at its upstream end and in a plane at right angles to the axis of said stem, said face having a diameter slightly less than the diameter of said bore, said plug having a backing disc of hard rubber-like material and an outer cushion of soft rubber-like material bonded to said disc, said disc being adjacent said smaller diameter base of said plug and extending substantially over the entire area of said face, and said outer cushion of soft rubber-like material radially outside of said disc engaging the walls of said bore to seal the same with an initial line contact, there being sufficient of said outer cushion of soft rubber-like material, radially outside of said disc, to permit said plug to pass through said bore.

3. The combination of claim 2 including means engaging the upstream end of said plug and securing said plug to said stem, and rigid spacer means engaging between said securing means and said disc, whereby the pressure exerted by said securing means is transmitted by said spacer means over the entire area of said disc so as to hold said plug firmly to said face.

4. A valve for cooperation with a substantially cylindrical valve bore of predetermined diameter and comprising a stem, a resilient sealing plug secured to said stem, said plug having a generally frusto-conical form with its smaller diameter base downstream and of less diameter than the diameter of the bore and with a base of larger diameter not substantially greater than the diameter of said bore, said stem having a face at its upstream end and in a plane at right angles to the axis of said stem, said face having a diameter slightly less than the diameter of said bore, said plug having an outer cushion of resilient material and a backing disc of less resilient material bonded to said cushion, said disc being adjacent said smaller diameter base of said plug and extending substantially over the entire area of said face, and said outer cushion of resilient material radially outside of said disc engaging the walls of said bore to seal the same with an initial line contact, there being sufficient of said outer cushion of resilient material, radially outside of said disc, to permit said plug to pass through said bore.

HENRY J. RAND.

References Cited in the file of this patent

UNITED STATES PATENTS

| Number | Name | Date |
| --- | --- | --- |
| 588,765 | Draullette | Aug. 24, 1897 |
| 591,072 | Bourne | Oct. 5, 1897 |
| 2,132,894 | Esnard | Oct. 11, 1938 |
| 2,148,850 | Deakins | Feb. 28, 1939 |
| 2,209,709 | Weatherhead | July 30, 1940 |
| 2,240,129 | Broecker | Apr. 29, 1941 |
| 2,299,068 | Gora | Oct. 20, 1942 |
| 2,311,748 | Gora | Feb. 23, 1943 |
| 2,473,591 | Killner | June 21, 1949 |

FOREIGN PATENTS

| Number | Country | Date |
| --- | --- | --- |
| 2,710 | Great Britain | of 1890 |